UNITED STATES PATENT OFFICE.

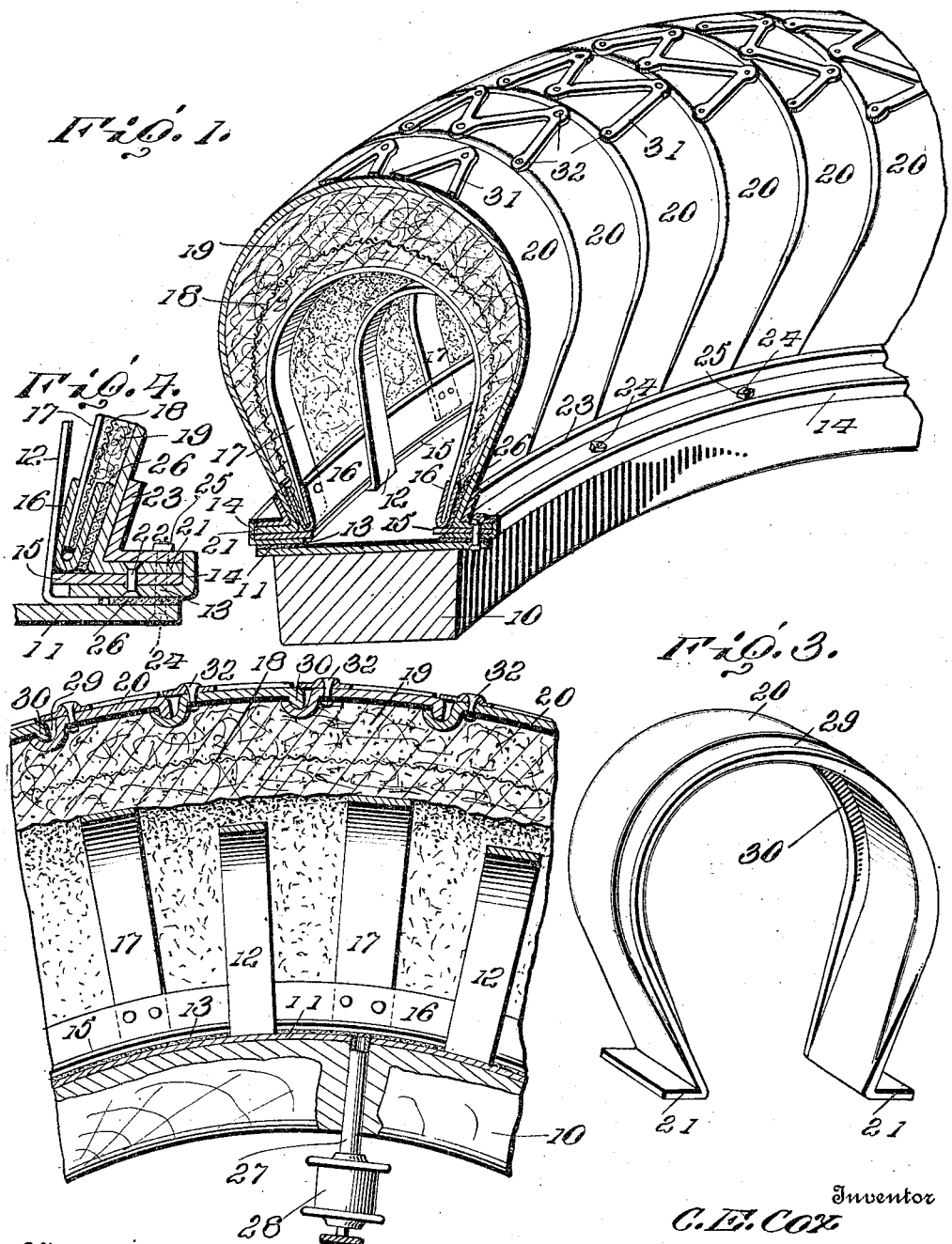

CLARENCE E. COX, OF FAIRFAX, MISSOURI.

METALLIC TIRE.

1,014,814.  Specification of Letters Patent.  Patented Jan. 16, 1912.

Application filed June 20, 1910. Serial No. 568,026.

*To all whom it may concern:*

Be it known that I, CLARENCE E. COX, citizen of the United States, residing at Fairfax, in the county of Atchison and State of Missouri, have invented certain new and useful Improvements in Metallic Tires, of which the following is a specification.

This invention relates to resilient tires for motor vehicles and the like, and has for an object to form a metallic tire which is made from flexible material so as to obviate the puncturing and flattening of a tire as well as to form a tire which will withstand considerable wear.

The invention contemplates a tire formed from spring steel which is lined with wire meshing interwoven with wool and asbestos to reduce the friction between the metallic parts, to provide reinforcing springs and auxiliary springs within the steel section, and to provide the tire with an oil feeding device to keep the springs from corroding.

The invention has for another object to form a tire of a plurality of interlocking spring steel sections which carry anti-skid devices to partially overlay the adjacent sections for the purpose of insuring the interlocking of the sections and to thereby strengthen the tire.

For a full understanding of the invention reference is to be had to the following description and accompanying drawing, in which:—

Figure 1 is a detail perspective view of a section of the improved tire. Fig. 2 is a detail longitudinal sectional view through the tire. Fig. 3 is a perspective view of one of the interlocking sections detached. Fig. 4 is a detail sectional view of one edge of the tire and its adjacent parts.

Corresponding and like parts are referred to in the following description and indicated in all the views of the accompanying drawing by the same reference characters.

Referring to the drawing the improved tire comprises a metallic shell or casing formed of a plurality of interlocking segmental sections 20 having outturned flanges 21 at their extremities to engage with the rim 11. The rim 11 is attached in any approved manner to the felly 10. Within the shell, and supported upon the rim 11 are a plurality of reinforcing springs 17 extending outwardly from the rim and conforming in shape to, but being slightly reduced in size from the sections 20. A filling 19, reinforced by wire-meshing 18, is interposed between the casing sections 20 and the springs 17. The filling 19 is preferably formed from asbestos or other heat non-conducting substance so as to prevent the rubbing of the springs 17 against the inner faces of the sections 20 and to prevent the passage of the heat from the sections 20 to the springs 17. The filling 19 is preferably interwoven through the meshing 18 and terminates adjacent the inner ends of the springs 17, the meshing 18 being secured against the outer faces of the springs 17 at their ends. The metallic casing is provided with reduced springs 12 which are arranged alternately with the springs 17 but which do not extend from the rim 11 to as great a distance as the springs 17. The springs 12 are adapted to augment the springs 17 in supporting the load upon the flexing of the metallic casing by the load, or by the sudden jar of the casing against an obstacle. The springs 12 are outturned at their free ends to engage beneath the flanges 21 and the lower edges of the springs 17. Bands 15 are arranged beneath the flanges 21 of the main casing sections 20 to support the same, and rest upon the upper faces of the rings 13 which are carried against the rim 11. The outturned flanges of the springs 12 engage beneath the rings 13 while channel members 16 rest upon the upper faces of the bands 15. The channel members 16 have their free ends directed outwardly from the rim 11 and receive therebetween the edges of the springs 17 and the wire meshing 18. Suitable packing strips 26 are interposed between the casing sections 20 and the channel members 16, as well as between the rim 11 and the rings 13. The rings 13 are provided at their outer longitudinal edges with outturned flanges 14 extending beyond the upper faces of the flanges 21 to receive retaining strips 23 of angular form having the flanges thereof seating respectively against the sides of the casing sections 20 and the flanges 21. Retaining bolts 24 pass inwardly through the retaining members 23 and the adjacent elements and receive clamping nuts 25 engaging upon their threaded extremities and against the inner face of the rim 11.

The casing sections 20 are provided with anti-skid devices forming retaining means for interlocking the sections and comprising beads 31 of W-form. The extremities of the beads are of greater thickness than the body portions thereof and are suitably apertured to receive tapering rivets 32 engaging through the threaded portions of the casing sections 20. The casing sections 20 are each provided at one edge with a groove 29 formed by crimping the section and at its opposite edge with an inwardly extending tongue 30 adapted to engage in the adjacent groove 29. The ends of the beads 31 project slightly beyond the edges of the sections 20 to overhang the grooves 29 and rest against the upper faces of the adjacent sections 20 to retain the tongues 30 within the grooves. The heads 31 thus form an interlocking means between the sections 20 as well as an anti-skidding device upon the tread of the tire. An oil-tube 27 extends through the rim 11 and passes inwardly through the felly 10 to support upon its extremities an oil-cup 28 communicating with the tube 27 for feeding a lubricant to the interior of the improved tire.

Having thus described the invention what is claimed as new is:—

1. A tire including a plurality of metallic sections each having grooves at one edge and inturned tongues at its opposite edge, the tongues and the grooves being formed for interlocking engagement, and beads carried upon the outer faces of the sections and overhanging the grooves to retain the tongues therein.

2. A tire comprising sections having interlocking tongues and grooves, and angular beads carried on the sections and having their angular portions extending over the tongues and grooves to hold the same at spaced points from spreading apart.

In testimony whereof, I affix my signature in presence of two witnesses.

CLARENCE E. COX. [L. S.]

Witnesses:
RAY C. WHITFORD,
N. F. DRAGOS.